United States Patent
Park et al.

(10) Patent No.: US 9,734,113 B2
(45) Date of Patent: Aug. 15, 2017

(54) PERIPHERAL COMPONENT INTERCONNECT EXPRESS (PCI-E) SIGNAL TRANSMISSION APPARATUS AND IMAGE FORMING APPARATUS USING THE SAME

(75) Inventors: Seung-hun Park, Suwon-si (KR); In-gu Kwak, Yongin-si (KR); Jai-yeol Lee, Suwon-si (KR); Eun-ju Hong, Seoul (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 1008 days.

(21) Appl. No.: 12/700,846

(22) Filed: Feb. 5, 2010

(65) Prior Publication Data

US 2010/0265537 A1    Oct. 21, 2010

(30) Foreign Application Priority Data

Apr. 20, 2009    (KR) .................... 10-2009-0034134

(51) Int. Cl.
*G06F 13/40* (2006.01)

(52) U.S. Cl.
CPC .... *G06F 13/409* (2013.01); *G06F 2213/0026* (2013.01)

(58) Field of Classification Search
CPC .................. G06F 13/409; G06F 2213/0026
USPC .................. 710/305, 313–315; 358/1.15
See application file for complete search history.

(56) References Cited

U.S. PATENT DOCUMENTS

| | | | |
|---|---|---|---|
| 6,801,329 B1 | 10/2004 | Urabe et al. | |
| 7,174,411 B1* | 2/2007 | Ngai ........................ | 710/316 |
| 7,411,421 B1* | 8/2008 | Steinke et al. ................. | 326/83 |
| 7,453,283 B2* | 11/2008 | Whetsel ........................ | 326/30 |
| 2005/0052678 A1 | 3/2005 | Urabe et al. | |
| 2008/0071963 A1* | 3/2008 | Chow et al. ................. | 710/313 |
| 2008/0155156 A1 | 6/2008 | Mussatt et al. | |
| 2008/0209098 A1 | 8/2008 | Landers et al. | |
| 2008/0244141 A1 | 10/2008 | Babin | |
| 2009/0279889 A1* | 11/2009 | Kirkpatrick et al. ........... | 398/41 |
| 2010/0180067 A1* | 7/2010 | Garcia et al. ................. | 711/103 |
| 2011/0007464 A1* | 1/2011 | Leigh ........................ | 361/679.01 |
| 2011/0040919 A1* | 2/2011 | Aihara et al. ................. | 710/305 |
| 2012/0033370 A1* | 2/2012 | Reinke et al. ............. | 361/679.4 |

FOREIGN PATENT DOCUMENTS

| | | |
|---|---|---|
| JP | 2001-16382 | 1/2001 |
| JP | 3139327 | 2/2008 |
| KR | 10-0816995 | 3/2008 |

OTHER PUBLICATIONS

PCIe Over Cable for High-Speed I/O, Bus Expansion and Networking, Technology in Context, Aug. 2008.*
PCI Express Cabling, LSI Corporation, 2007.*

(Continued)

*Primary Examiner* — Glenn A Auve
(74) *Attorney, Agent, or Firm* — Staas & Halsey LLP

(57) ABSTRACT

A PCI-E signal transmission apparatus and an image forming apparatus using the same are provided. The PCI-E signal transmission apparatus includes a controller board, and at least one unit board which is connected to the controller board through a differential signal transmission cable, which uses a PCI-E protocol, to transceive data. Therefore, it is possible to transmit a signal using an inexpensive cable at a high speed.

10 Claims, 4 Drawing Sheets

(56) References Cited

OTHER PUBLICATIONS

Low-Voltage Differential Signaling (LVDS), Texas Instruments, 2000.*
Differential Signaling, <http://en.wikipedia.org/wiki/Differential_signaling>, accessed on Jul. 30, 2012.*
PCI Express External Cabling Specification, Revision 1.0, Jan. 4, 2007.*
Serial ATA, <http://en.wikipedia.org/wiki/Serial_ATA>, accessed Mar. 5, 2015.*
European Search Report issued Jun. 15, 2010 in EP Application No. 10158548.7.
Office Action mailed Mar. 11, 2016 in European Patent Application No. 10 158 548.7.
Summons to attend oral proceedings issued Jul. 7, 2015 in corresponding European Patent Application No. 10158548.7 (3 pages).
Korean Office Action dated Apr. 6, 2015 in corresponding Korean Patent Application No. 10-2009-0034134, 7 pages.

* cited by examiner

PERIPHERAL COMPONENT INTERCONNECT EXPRESS (PCI-E) SIGNAL TRANSMISSION APPARATUS AND IMAGE FORMING APPARATUS USING THE SAME

CROSS-REFERENCE TO RELATED APPLICATIONS

This application claims the benefit under 35 U.S.C. §119(a) from Korean Patent Application No. 10-2009-0034134, filed on Apr. 20, 2009, in the Korean Intellectual Property Office, the disclosure of which is incorporated herein by reference in its entirety.

BACKGROUND

1. Field of the Invention

The present general inventive concept relates to a peripheral component interconnect express (PCI-E) signal transmission apparatus, and an image forming apparatus using the same. More particularly, the present general inventive concept relates to a PCI-E signal transmission apparatus capable of transmitting a signal using an inexpensive cable at a high speed, and an image forming apparatus using the same.

2. Description of the Related Art

Many apparatuses and peripheral devices which are currently used are connected to a main control system so that they may operate with a wider bandwidth and greater extension capability. Conventionally, a parallel signal transmission scheme is used to connect apparatuses and peripheral devices to a main control system. However, the parallel signal transmission scheme causes a decrease in performance of the system due to a low transmission rate.

To overcome such limitations of the parallel signal transmission scheme, the data transmitting scheme has been changed from the parallel signal transmission scheme to a serial signal transmission scheme, and a peripheral component interconnect express (PCI-E) based scheme for transmitting a signal at a high speed has been used in which a bus width is reduced and the data transmission rate is increased. Use of the PCI-E based scheme makes a complicated process of computer-aided design (CAD) routing simple, and increases the data transmission rate.

In more detail, to transmit a signal using the PCI-E based scheme, an expensive PCI-E external cable and a connector suitable for the PCI-E external cable are required. In this situation, the PCI-E external cable needs to be connected to an apparatus via a connection path which is formed on the outside of the apparatus, so if the PCI-E external cable is connected to the apparatus, the PCI-E external cable protrudes from the apparatus. Additionally, if the PCI-E external cable is inserted into the apparatus, the PCI-E external cable is too thick to be fitted in the apparatus.

Furthermore, the PCI-E external cable comprises 18 pins in total. Among 18 pins, pins corresponding to pair signals Tx and Rx and three to four GND pins are used to transmit signals. In other words, as only seven to eight pins of the 18 pins are used to transmit signals, less than 50% of the signal line is actually used.

As described above, when the PCI-E based scheme is used, a signal is able to be transmitted at a high speed as compared to the conventional parallel signal transmission scheme, but many problems may occur. In more detail, the PCI-E based scheme requires an expensive PCI-E external cable and a connector, and sets a connection path to the outside of an apparatus. Additionally, it is difficult to fix the PCI-E external cable and secure space, and signal lines are wasted. Therefore, there is a need for methods to solve these problems while maintaining the advantages of the PCI-E based scheme.

SUMMARY

The present general inventive concept provides a peripheral component interconnect express (PCI-E) signal transmission apparatus, which is capable of transmitting a signal using an inexpensive cable at a high speed and capable of increasing extension capability of a connection path, and an image forming apparatus using the same.

Additional aspects and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a peripheral component interconnect express (PCI-E) signal transmission apparatus including a controller board, and at least one unit board which is connected to the controller board through a differential signal transmission cable, which uses a PCI-E protocol, to transceive data.

The controller board may include a first differential signal connector which is connected to a first end of the differential signal transmission cable, and the at least one unit board may include a second differential signal connector which is connected to a second end of the differential signal transmission cable.

The first differential signal connector may be disposed on one of a top and side of the controller board, and the second differential signal connector may be disposed on one of a top and side of the at least one unit board.

The at least one unit board may supply for itself a control signal to process the transceived data.

The at least one unit board may receive the control signal to process the transceived data from the controller board via a single-ended signal transmission cable.

The controller board may include a first single-ended signal connector which is connected to a first end of the single-ended signal transmission cable, and the at least one unit board may include a second single-ended signal connector which is connected to a second end of the single-ended signal transmission cable.

The single-ended signal transmission cable may be one of a harness cable, a flat flexible cable (FFC), a universal serial bus (USB) cable and a local area network (LAN) cable.

The differential signal transmission cable may be one of a serial advanced technology architecture (SATA) cable, a serial attached SCSI (SAS) cable and an eSATA cable.

The foregoing and/or other features and utilities of the present general inventive concept may be achieved by providing an image forming apparatus having a peripheral component interconnect express (PCI-E) signal transmission function, the image forming apparatus including a controller, a differential signal transmission cable which is connected to the controller and uses a PCI-E protocol, and at least one unit which is connected to the controller through the differential signal transmission cable, to transceive data.

The at least one unit may include a scanning unit and a laser scanning unit (LSU).

The at least one unit may supply for itself a control signal to process the transceived data.

The at least one unit may receive the control signal to process the transceived data from the controller via a single-ended signal transmission cable.

The controller may include a first single-ended signal connector which is connected to a first end of the single-ended signal transmission cable, and the at least one unit may include a second single-ended signal connector which is connected to a second end of the single-ended signal transmission cable.

The single-ended signal transmission cable may be one of a harness cable, a flat flexible cable (FFC), a universal serial bus (USB) cable and a local area network (LAN) cable.

The differential signal transmission cable may be one of a serial advanced technology architecture (SATA) cable, a serial attached SCSI (SAS) cable and an eSATA cable.

The foregoing and/or other features and utilities of the present general inventive concept may be achieved by providing a peripheral component interconnect express (PCI-E) signal transmission apparatus including a differential signal transmission cable with a differential signal connector at one end connected to a controller board and a differential signal connector at the other end connected to a unit board. The differential signal transmission cable may carry PCI-E data and may consist of a transmit pair and a receive pair and ground cables.

A control signal for the unit board may be generated by a chip on the unit board.

A control signal for the unit board may be generated on the controller board and is transmitted to the unit board by an additional transmission cable.

The foregoing and/or other features and utilities of the present general inventive concept may be achieved by providing an image forming apparatus having a peripheral component interconnect express (PCI-E) signal transmission function. The image forming apparatus may include a control board and a differential signal transmission cable which is connected to the controller and uses a PCI-E protocol. The differential signal transmission cable may have a differential signal connector at one end connected to the controller board and a differential signal connector at the other end connected to a unit board to transceive data. The differential signal transmission cable may carry PCI-E data and may consist of a transmit pair and a receive pair and ground cables.

A control signal for the unit board may be generated by a chip on the unit board.

A control signal for the unit board may be generated on the controller board and is transmitted to the unit board by an additional transmission cable.

BRIEF DESCRIPTION OF THE DRAWINGS

These and/or other features and advantages of the present general inventive concept will become apparent and more readily appreciated from the following description of the embodiments, taken in conjunction with the accompanying drawings of which.

DETAILED DESCRIPTION OF THE EMBODIMENTS

Figure 1:
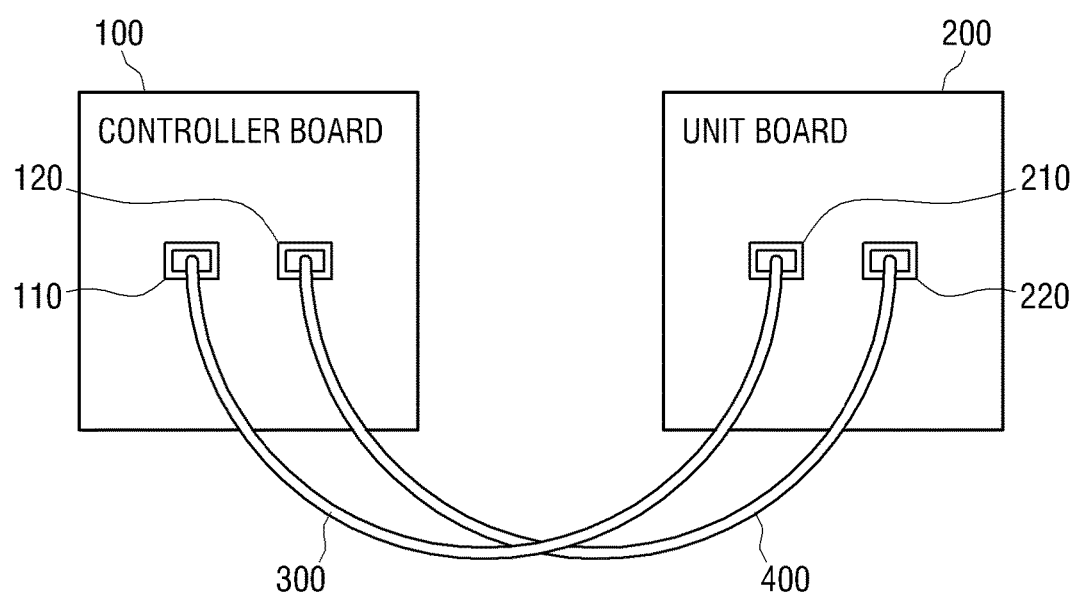
FIG. 1 illustrates a schematic view of a peripheral component interconnect express (PCI-E) signal transmission apparatus according to an exemplary embodiment of the present general inventive concept.

Reference will now be made in detail to various exemplary embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 illustrates a schematic view of a peripheral component interconnect express (PCI-E) signal transmission apparatus according to an exemplary embodiment of the present general inventive concept.

In FIG. 1, the PCI-E signal transmission apparatus may include a controller board 100 and at least one unit board 200. While only one unit board 200 is shown in FIG. 1, the PCI-E signal transmission apparatus may include two or more unit boards.

Herein, the PCI-E signal transmission apparatus may be a multifunctional apparatus in which various independent units are combined. In this situation, each of the units may include a unit board 200, and a controller to control overall operations of the units may include a controller board 100.

A signal for PCI-E communication may include data and control signals. The data refers to actual data such as a scanned image. The PCI-E standard uses lanes to transmit and receive data, in a full-duplex stream, transporting packets containing data in 8 bit 'byte' format, between the two endpoints of a link, in both directions simultaneously. Additionally, control signals refer to signals to control an operation of a chip for processing data among a plurality of chips included in the unit board 200 to be activated. Furthermore, a reference clock of the control signal may be required to perform a minimum level of communication.

In the exemplary embodiment of the present general inventive concept, the data may be transceived between the controller board 100 and the unit board 200 through a differential signal transmission cable 300. However, the control signal may be transceived between the controller board 100 and the unit board 200 through a single-ended signal transmission cable 400, or may be supplied by the unit board 200 itself. A process by which the unit board 200 supplies the control signal for itself will be described in detail below.

The controller board 100 included in the controller may be connected to the unit board 200 of each of the units in the PCI-E signal transmission apparatus by additional differential signal transmission cables 300 and control signals, provided either by additional single-ended signal transmission cables 400, or supplied by the unit boards 200, in order to control each of the units.

The controller board 100 may be connected to the unit board 200 via the differential signal transmission cable 300 to transceive predetermined data. Additionally, the controller board 100 may transmit the control signal via the single-ended signal transmission cable 400.

The differential signal transmission cable 300 may be used to transceive a differential signal between the controller board 100 and the unit board 200 using a PCI-E protocol. The differential signal refers to a signal transmitting data over a pair of transmission lines, namely a positive signal line and a negative signal line. The differential signal transmission cable 300 may be, for example, one of a serial advanced technology architecture (SATA) cable, a serial attached SCSI (SAS) cable or an eSATA cable. The differential signal transmission cable 300 will be described in detail with reference to FIG. 2 below. The physical cable is selected in order to transceive predetermined data as necessary as well as to conform to space requirements and convenience.

The single-ended signal transmission cable 400 may connect the controller board 100 to the unit board 200, and may transmit the control signal from the controller board 100 to the unit board 200. A single-ended signal refers to signal transmitting data over a single transmission line. The single-ended signal transmission cable 400 may be, for example, one of a harness cable, a flat flexible cable (FFC), a universal serial bus (USB) cable or a local area network (LAN) cable. The physical cable is selected in order to transmit data as necessary as well as to conform to space requirements and convenience.

The controller board 100 may include a first differential signal connector 110 and a first single-ended signal connector 120. The first differential signal connector 110 and first single-ended signal connector 120 may be disposed on the top or side of the controller board 100. The first differential signal connector 110 may be connected to a first end of the differential signal transmission cable 300, and the first single-ended signal connector 120 may be connected to a first end of the single-ended signal transmission cable 400. Accordingly, the controller board 100 needs to include the first differential signal connector 110 connected to the differential signal transmission cable 300, but may not include the first single-ended signal connector 120 if it is not necessary.

The unit board 200 may be included in each of various independent units in the PCI-E signal transmission apparatus. The unit board 200 may transmit or receive data to or from the controller board 100 via the differential signal transmission cable 300, and may receive a control signal from the controller board 100 via the single-ended signal transmission cable 400.

As illustrated in FIG. 1, the controller board 100 may be connected to the unit board 200 through the differential signal transmission cable 300 and the single-ended signal transmission cable 400. However, in this situation, there is no need to use both the two cables.

For example, the controller board 100 may be connected to the unit board 200 through the differential signal transmission cable 300 only. In this situation, the unit board 200 may supply for itself a control signal to control data which is transmitted or received to or from the control board 100, and thus it is not necessary to use the single-ended signal transmission cable 400.

Although not illustrated herein, the unit board 200 may include a plurality of chips. Among the plurality of chips, a chip to generate a control signal may exist, and an operation of the chip may enable the unit board 200 to supply the control signal. The control signal may be a clock signal with a predetermined cycle. The process by which the unit board 200 supplies the control signal for itself is known to those skilled in the art, so no further description thereof is herein provided.

The unit board 200 may include a second differential signal connector 210 and a second single-ended signal connector 220. The second differential signal connector 210 and second single-ended signal connector 220 may be disposed on the top or side of the unit board 200. The second differential signal connector 210 may be connected to a second end of the differential signal transmission cable 300, and the second single-ended signal connector 220 may be connected to a second end of the single-ended signal transmission cable 400.

Accordingly, the unit board 200 needs to include the second differential signal connector 210 connected to the differential signal transmission cable 300, but may not include the second single-ended signal connector 220 if it is not necessary. In other words, since there is no need to receive the control signal from the controller board 100 when the unit board 200 supplies the control signal for itself, the unit board 200 may not include the second single-ended signal connector 220.

Figure 2:
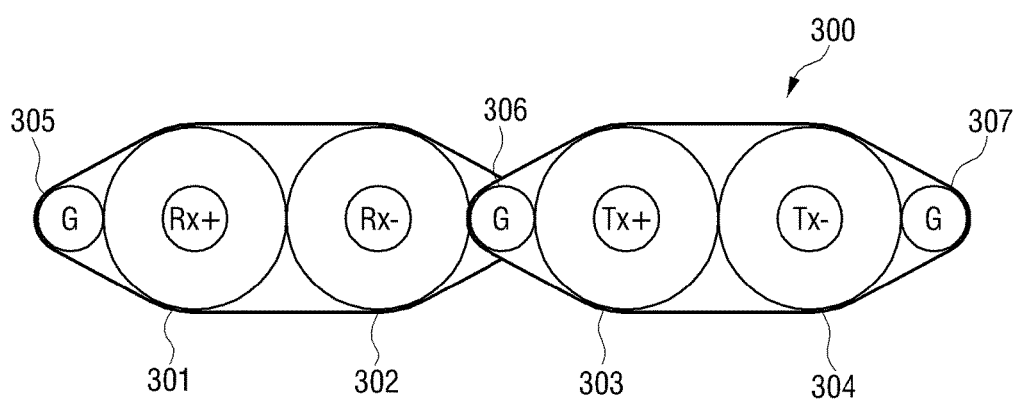
FIG. 2 illustrates a cross-sectional view of a differential signal transmission cable illustrated in FIG. 1.

FIG. 2 illustrates a cross-sectional view of the differential signal transmission cable 300.

First, an existing PCI-E external cable is now described briefly.

The PCI-E external cable that has been used for PCI-E protocol transmission needs to extend toward the outside of an apparatus to be connected. In other words, the PCI-E external cable is of a right angle type, and accordingly the controller board 100 and the unit board 200 need to be connected via the PCI-E external cable, outside the two boards at all times.

Additionally, the PCI-E external cable may include 18 pins in total, but only 7 to 8 pins of the 18 pins may be used for actual signal transmission. Accordingly, it is disadvantageous to use the PCI-E external cable, because the PCI-E external cable needs to be always exposed outside and is very expensive, and pins of the PCI-E external cable are wasted.

Hereinafter, the differential signal transmission cable 300 of the PCI-E signal transmission apparatus is described with reference to FIG. 2. Referring to FIG. 2, the differential signal transmission cable 300 may include seven pins in total. While only seven pins are shown in FIG. 2, the differential signal transmission cable 300 may have additional unused pins.

In more detail, the differential signal transmission cable 300 may include four pins corresponding to data pair signals Rx+301, Rx−302, Tx+303 and Tx−304, and three pins corresponding to the ground GND 305, 306, and 307, in order to perform PCI-E protocol transmission. The seven pins 301-307 of the differential signal transmission cable 300 are the minimum signal line needed to transmit PCI-E data.

The first end of the differential signal transmission cable 300 may be connected to the first differential signal connector 110 of the controller board 100, and the second end thereof may be connected to the second differential signal connector 210 of the unit board 200. Accordingly, the differential signal transmission cable 300 can connect the controller board 100 to the unit board 200, so that data can be transceived between the controller board 100 and the unit board 200.

The differential signal transmission cable 300 may supply both the right angle type and the straight type. Accordingly, the differential signal transmission cable 300 can be connected to the top or side of the controller board 100 and to the top or side of the unit board 200. In other words, the differential signal transmission cable 300 may be disposed inside or outside the controller board 100 and the unit board 200, and thus it is easy to perform computer-aided design (CAD) routing for data transmission between the controller board 100 and the unit board 200.

Since the differential signal transmission cable 300 includes only a signal line necessarily required for PCI-E data transmission, all the seven pins may be used in data transmission.

Therefore, use of the differential signal transmission cable 300 may prevent waste of signal lines. Additionally, the differential signal transmission cable 300 is inexpensive compared to the existing PCI-E external cable, and thus it is possible to reduce the cost of the PCI-E signal transmission apparatus.

Figure 3:
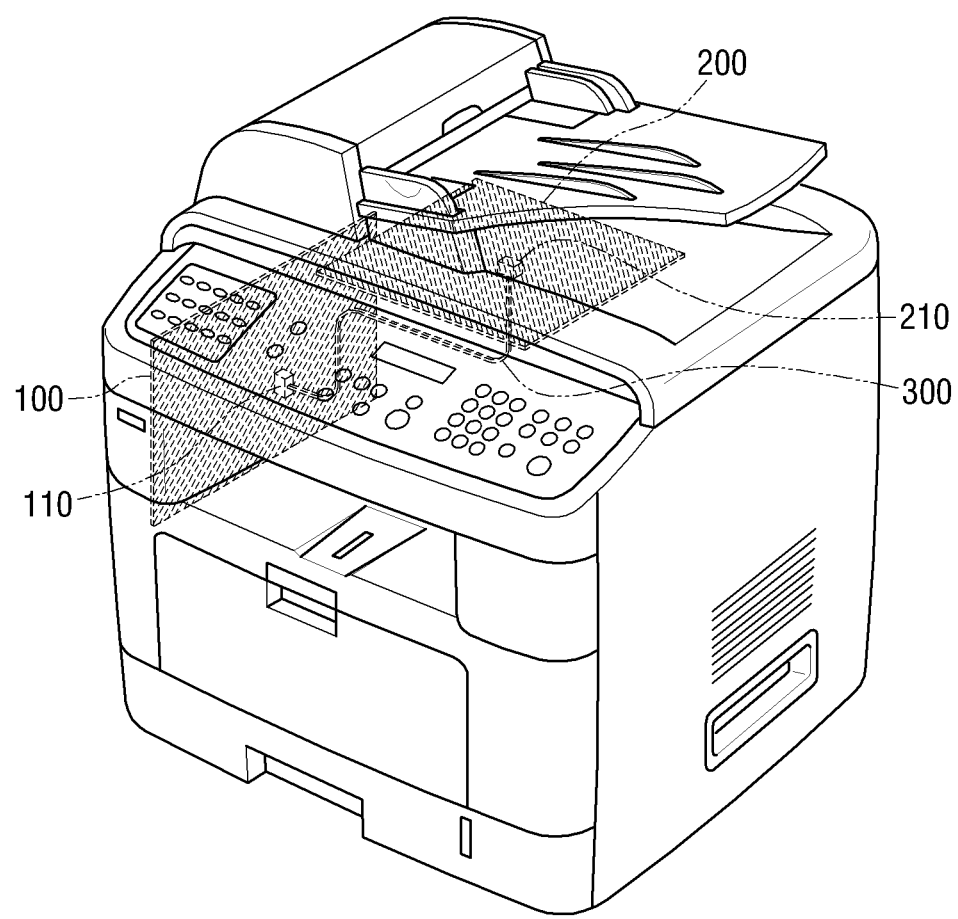
FIG. 3 illustrates a perspective view of an image forming apparatus in which the PCI-E signal transmission apparatus of FIG. 1 is mounted.

FIG. 3 illustrates a perspective view of an image forming apparatus in which the PCI-E signal transmission apparatus of FIG. 1 is mounted.

In FIG. 3, the image forming apparatus may be a multi-functional apparatus in which various independent units such as a printer, a scanner and a copier are combined.

The image forming apparatus of FIG. 3 may include a controller board 100 included in a controller (not illustrated), and a unit board 200 included in each unit. While only one unit is shown in FIG. 3, two or more units may include a unit board 200. Herein, each unit may include a scanning unit and a laser scanning unit (LSU).

The controller board 100 and the unit board 200 may be connected to each other via a differential signal transmission cable 300. In other words, the differential signal transmission cable 300 may function to connect the controller board 100 to the unit board 200 in the image forming apparatus.

The image forming apparatus of FIG. 3 may also include a first differential signal connector 110 and a second differential signal connector 210 which are disposed on the top of the controller board 100 and the top of the unit board 200, respectively, in the same manner as those illustrated in FIG. 1, but there is no limitation thereto. Accordingly, the first differential signal connector 110 and the second differential signal connector 210 may be disposed on the side of the controller board 100 and the side of the unit board 200, respectively.

The differential signal transmission cable 300 is mounted inside the image forming apparatus, as illustrated in FIG. 3, and thus is less likely to be damaged and improves the appearance of the image forming apparatus.

Figure 4:
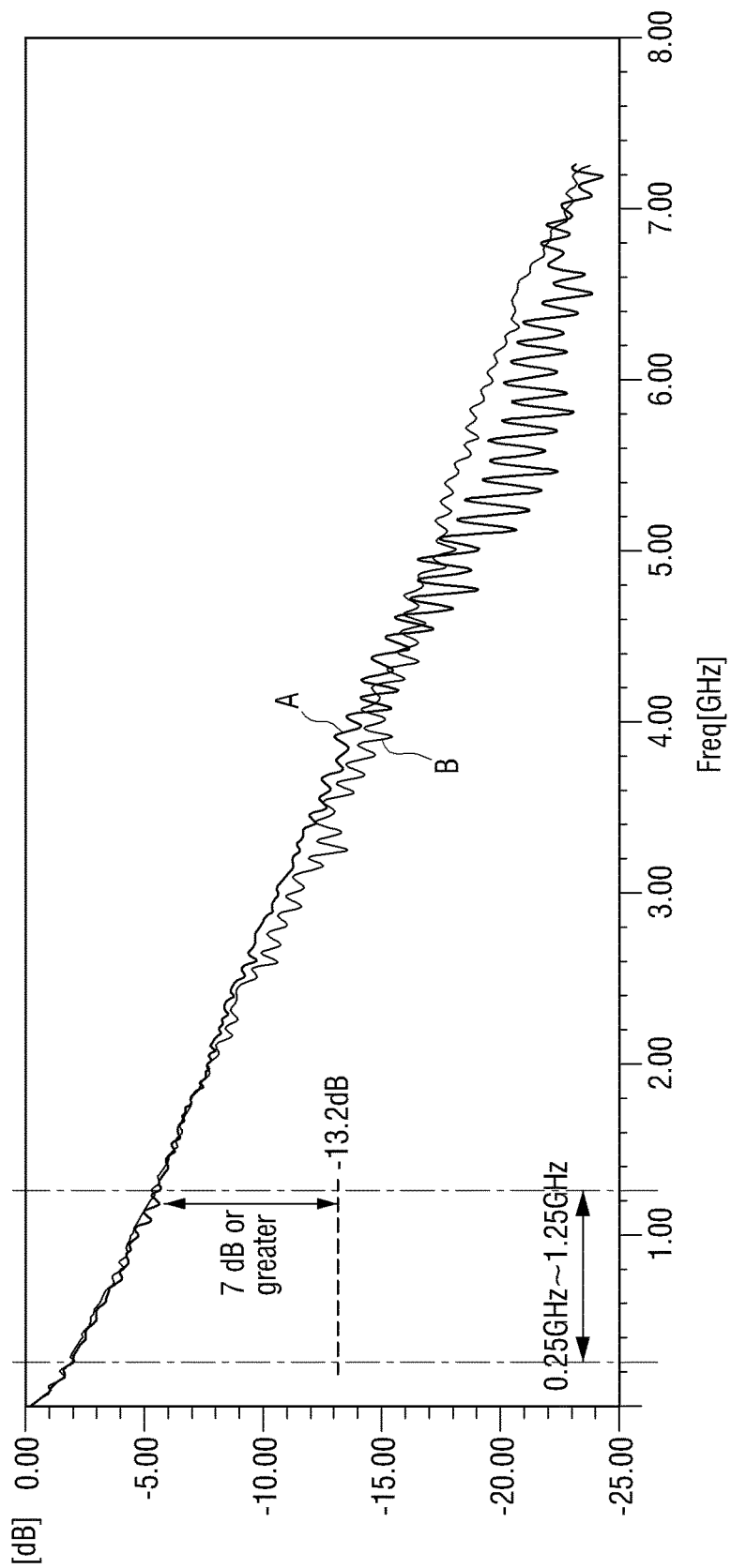
FIG. 4 illustrates a graph of comparison in performance between an existing PCI-E external cable and the differential signal transmission cable illustrated in FIG. 2.

FIG. 4 illustrates a graph of comparison in performance between the existing PCI-E external cable and the differential signal transmission cable 300 of the PCI-E signal transmission apparatus according to the exemplary embodiment of the present general inventive concept.

The graph of FIG. 4 depicts the differential insertion loss using an S-parameter. S-parameters are used for networks operating at radio frequencies (RF) where signal power and energy considerations are more easily quantified than currents and voltages. S-parameters do not use open or short circuit conditions to characterize a linear electrical network, but instead use matched loads. These terminations are much easier to use at high signal frequencies than open-circuit and short-circuit terminations. Moreover, the quantities are measured in terms of power.

In this situation, the differential insertion loss relates to how much loss occurs when a signal goes into an input port and comes out of an output port through each of the existing PCI-E external cable and the differential signal transmission cable 300. Herein, the S-parameter refers to a ratio of a voltage wave reflected by a predetermined port to an electromagnetic wave which enters the predetermined port.

The differential signal transmission cable 300 of the PCI-E signal transmission apparatus according to the exemplary embodiment of the present general inventive concept may use the PCI-E protocol, and needs to conform to the loss specification for cable ports defined by a PCI-special interest group (SIG). According to this specification, PCI-E protocol transmission can be performed only in a system in which there is no loss greater than −13.2 dB as a result of checking the differential insertion loss.

In the graph of FIG. 4, "A" represents an S-parameter when the PCI-E external cable is used to transmit a signal, and "B" represents an S-parameter when the differential signal transmission cable 300 is used to transmit a signal.

Comparing A to B, the PCI-E external cable exhibits similar characteristics to the differential signal transmission cable 300 in the range of about 0 GHz to about 2 GHz, but the PCI-E external cable exhibits slightly better transmission characteristics than the differential signal transmission cable 300 in the range of about 2 GHz to about 4 GHz. However, in the range of about 4 GHz or greater, the differential signal transmission cable 300 has better transmission characteristics than the PCI-E external cable.

Additionally, when using the differential signal transmission cable 300, from the range of about 0.25 GHz to about 1.25 GHz, a loss greater than −13.2 dB is not permitted. Accordingly, as illustrated in FIG. 4, there is no loss greater than −13.2 dB from the range of about 0.25 GHz to about 1.25 GHz, and it is thus possible to secure a margin greater than 7 dB when the differential signal transmission cable 300 is used.

As described above, the differential signal transmission cable 300 can eliminate unused signal lines, and can connect the controller board 100 and the unit board 200 inside the PCI-E signal transmission apparatus.

Additionally, the transmission performance of the differential signal transmission cable 300 may be equal to or greater than that of the existing PCI-E external cable. Therefore, it is possible to transmit a signal using an inexpensive cable at a high speed.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus having a peripheral component interconnect express (PCI-E) signal transmission function, the image forming apparatus comprising:
   a controller disposed inside the image forming apparatus;
   a differential signal transmission cable to connect the controller to a scanning unit using a PCI-E protocol to transceive data signals using the PCI-E protocol between the controller and the scanning unit; and
   wherein the differential signal transmission cable which transmits and receives the data signals using the PCI-E protocol includes only seven cables, and
   wherein the seven cables consist of:
   a pair of first data cables which are configured to transmit the data signals, using the PCI-E protocol, and are located beside each other with no other cable between the pair of first data cables;
   a pair of second data cables which are configured to receive the data signals, using the PCI-E protocol, and are located beside each other with no other cable between the pair of second data cables; and
   a ground line which is respectively disposed on one side of the pair of first data cables, between the pair of first data cables and the pair of second data cables, and on another side of the pair of second data cables.

2. The image forming apparatus according to claim 1, wherein the scanning unit supplies for itself a control signal to process the transceived data signals.

3. The image forming apparatus according to claim 1, wherein the scanning unit receives a control signal to process the transceived data signals from the controller via a single-ended signal transmission cable.

4. The image forming apparatus according to claim 3, wherein:
the controller comprises a first single-ended signal connector which is connected to a first end of the single-ended signal transmission cable, and
the scanning unit comprises a second single-ended signal connector which is connected to a second end of the single-ended signal transmission cable.

5. The image forming apparatus according to claim 3, wherein the single-ended signal transmission cable is one of a harness cable, a flat flexible cable (FFC), a universal serial bus (USB) cable and a local area network (LAN) cable.

6. An image forming apparatus having a peripheral component interconnect express (PCI-E) signal transmission function, the image forming apparatus comprising:
a controller disposed inside the image forming apparatus;
a laser scanning unit (LSU) disposed inside the image forming apparatus; and
a differential signal transmission cable to connect the controller to the LSU using a PCI-E protocol to transceive data signals between the controller and the LSU, and
wherein the differential signal transmission cable which transmits the data signals using the PCI-E protocol includes only seven cables, and
wherein the seven cables consist of:
a pair of first data cables which are configured to transmit the data signals, using the PCI-E protocol, and are located beside each other with no other cable between the pair of first data cables;
a pair of second data cables which are configured to receive the data signals, using the PCI-E protocol, and are located beside each other with no other cable between the pair of second data cables; and
a ground line which is respectively disposed on one side of the pair of first data cables, between the pair of first data cables and the pair of second data cables, and on another side of the pair of second data cables.

7. The image forming apparatus according to claim 6, wherein a control signal for the LSU is generated by a chip on the LSU.

8. The image forming apparatus according to claim 6, wherein a control signal for the LSU is generated on the controller and is transmitted to the LSU by an additional transmission cable.

9. The image forming apparatus according to claim 6, wherein the differential signal transmission cable being one of a SATA cable and an eSATA cable.

10. The image forming apparatus according to claim 6, wherein all pins included in the differential signal transmission cable are used in transmitting the data signals using the PCI-E protocol between the controller and the LSU.

* * * * *